US011171700B2

(12) United States Patent
Chigusa et al.

(10) Patent No.: US 11,171,700 B2
(45) Date of Patent: Nov. 9, 2021

(54) MAIN BEAM DIRECTION DETERMINING DEVICE, MAIN BEAM DIRECTION DETERMINING METHOD, AND PROGRAM

(71) Applicant: Sony Interactive Entertainment Inc., Tokyo (JP)

(72) Inventors: Issei Chigusa, Tokyo (JP); Masakazu Tanikawa, Chiba (JP); Katsuyoshi Onishi, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 141 days.

(21) Appl. No.: 16/614,895

(22) PCT Filed: Jun. 1, 2017

(86) PCT No.: PCT/JP2017/020468
§ 371 (c)(1),
(2) Date: Nov. 19, 2019

(87) PCT Pub. No.: WO2018/220793
PCT Pub. Date: Dec. 6, 2018

(65) Prior Publication Data
US 2020/0112354 A1    Apr. 9, 2020

(51) Int. Cl.
*H04W 4/00*    (2018.01)
*H04B 7/06*    (2006.01)
(Continued)

(52) U.S. Cl.
CPC ........... *H04B 7/0617* (2013.01); *A63F 13/23* (2014.09); *A63F 13/26* (2014.09); *H04W 72/046* (2013.01); *H04W 72/085* (2013.01); *H04W 84/12* (2013.01)

(58) Field of Classification Search
None
See application file for complete search history.

(56) References Cited

U.S. PATENT DOCUMENTS

2006/0116092 A1    6/2006  Huang
2009/0247182 A1*  10/2009  Tamate ............... H04W 72/082
                                                                  455/452.2
(Continued)

FOREIGN PATENT DOCUMENTS

| JP | 2006148928 A | 6/2006 |
| WO | 2011114412 A1 | 9/2011 |
| WO | 2017082256 A1 | 5/2017 |

OTHER PUBLICATIONS

Extended European Search Report for corresponding EP Application No. 17911505.0, 9 pages, dated Oct. 9, 2020.
(Continued)

*Primary Examiner* — Phirin Sam
(74) *Attorney, Agent, or Firm* — Matthew B. Dernier, Esq.

(57) ABSTRACT

Provided are a main beam direction determining device, a main beam direction determining method, and a program which are able to shorten a time required to determine a main beam direction. A secondary candidate sector selection unit selects a second number of primary candidates or a third number of primary candidates as a secondary candidate or candidates in accordance with a communication quality of communication by an HMD, the second number being smaller than a first number, the third number being smaller than the second number. A first sector level sweep process performing unit determines one of the secondary candidate or candidates as the main beam direction.

12 Claims, 11 Drawing Sheets

(51) Int. Cl.
*A63F 13/23* (2014.01)
*A63F 13/26* (2014.01)
*H04W 72/04* (2009.01)
*H04W 72/08* (2009.01)
*H04W 84/12* (2009.01)

(56) References Cited

U.S. PATENT DOCUMENTS

| | | |
|---|---|---|
| 2011/0110453 A1 | 5/2011 | Prasad |
| 2013/0002487 A1 | 1/2013 | Hosoya |
| 2015/0171946 A1* | 6/2015 | Hosoya .................. H01Q 3/24 |
| | | 375/267 |
| 2015/0247924 A1* | 9/2015 | Kishigami ............. G01S 7/411 |
| | | 342/70 |
| 2016/0373180 A1* | 12/2016 | Guo ..................... H04B 7/0695 |
| 2017/0094531 A1 | 3/2017 | Kakishima |
| 2018/0234137 A1* | 8/2018 | Qu ....................... H04B 7/0695 |
| 2018/0287679 A1 | 10/2018 | Onishi |
| 2019/0222279 A1* | 7/2019 | Xi ........................ H04B 7/0491 |
| 2020/0037297 A1* | 1/2020 | Pan ...................... H04B 7/0695 |
| 2020/0059867 A1* | 2/2020 | Haghighat .......... H04W 52/367 |

OTHER PUBLICATIONS

International Preliminary Report on Patentability and Written Opinion for corresponding PCT Application No. PCT/JP2017/020468, 13 pages, dated Dec. 12, 2019.
International Search Report for corresponding PCT Application No. PCT/JP2017/020468, 4 pages, dated Aug. 15, 2017.

* cited by examiner

FIG.6

| PRIMARY CANDIDATE SECTOR ID | MAIN BEAM ANGLE PARAMETER ($\phi$, $\theta$) |
|---|---|
| 1 | (−180,+45) |
| 2 | (−180,+67.5) |
| 3 | (−180,+90) |
| 4 | (−180,+112.5) |
| 5 | (−157.5,+45) |
| 6 | (−157.5,+67.5) |
| 7 | (−157.5,+90) |
| 8 | (−157.5,+112.5) |
| 9 | (−135,+45) |
| 10 | (−135,+67.5) |
| 11 | (−135,+90) |
| 12 | (−135,+112.5) |
| 61 | (+157.5,+45) |
| 62 | (+157.5,+67.5) |
| 63 | (+157.5,+90) |
| 64 | (+157.5,+112.5) |

MAIN BEAM DIRECTION DETERMINING DEVICE, MAIN BEAM DIRECTION DETERMINING METHOD, AND PROGRAM

TECHNICAL FIELD

The present invention relates to a main beam direction determining device, a main beam direction determining method, and a program.

BACKGROUND ART

In a wireless communication standard, such as Institute of Electrical and Electronics Engineers (IEEE) 802.11ad, a technique is known for determining, from among a plurality of candidates for a main beam direction, a direction that will provide a high communication quality when a communication is performed as a main beam direction to be used for communication by a communication device. An example of such a technique is sector level sweep in beamforming.

SUMMARY

Technical Problem

In recent years, a technique has been being studied for transmitting, for example, a moving image or an audio generated by a game device that executes a game program and representing a play situation in a game to a communication device, such as a head-mounted display (HMD), in a wireless manner, and causing the communication device to output the moving image or the audio.

For example, it may be important to shorten a time required to determine a main beam direction to be used for communication by the communication device, such as the HMD, in a situation in which an interruption of the communication is undesirable, such as when a user is playing a game.

The present invention has been conceived in view of the above circumstances, and an object of the present invention is to provide a main beam direction determining device, a main beam direction determining method, and a program which are able to shorten the time required to determine the main beam direction.

Solution to Problem

To address such a problem, a main beam direction determining device according to one aspect of the present invention is a main beam direction determining device that determines one of a first number of primary candidates as a main beam direction to be used for communication by a communication device. The main beam direction determining device includes: a selection unit configured to select a second number of primary candidates or a third number of primary candidates as a secondary candidate or candidates in accordance with a communication quality of the communication by the communication device, the second number being smaller than the first number, the third number being smaller than the second number; and a determination unit configured to determine one of the secondary candidate or candidates as the main beam direction.

In one embodiment of the present invention, the selection unit selects the secondary candidate or candidates on the basis of the main beam direction currently used for the communication by the communication device.

In this embodiment, the selection unit may select the secondary candidate or candidates in accordance with smallness of an angle formed by a direction associated with each primary candidate with the main beam direction currently used for the communication by the communication device.

Alternatively, it may be so arranged that the communication device includes a plurality of antennas, that some of the primary candidates are associated with each of the plurality of antennas, and that the selection unit selects, as the secondary candidate or candidates, some of the primary candidates associated with the antenna currently used for the communication by the communication device.

In one embodiment of the present invention, the main beam direction determining device further includes a communication quality data storage unit configured to store communication quality data indicating a communication quality associated with each of the primary candidates, and the selection unit selects the secondary candidate or candidates on the basis of the past communication qualities associated with the respective primary candidates, the past communication qualities being indicated by the communication quality data stored in the communication quality data storage unit.

Another main beam direction determining device according to one aspect of the present invention is a main beam direction determining device that determines one of a first number of primary candidates as a main beam direction to be used for communication by a communication device. The main beam direction determining device includes: a selection unit configured to select some of the first number of primary candidates as a secondary candidate or candidates on the basis of the main beam direction currently used for the communication by the communication device; and a determination unit configured to determine one of the secondary candidate or candidates as the main beam direction.

In one embodiment of the present invention, when the number of secondary candidates selected is two or more, the determination unit determines one of the two or more secondary candidates as the main beam direction on the basis of a communication quality of a communication performed with each of the two or more secondary candidates, while when the number of secondary candidates selected is one, the determination unit determines the one secondary candidate as the main beam direction.

In one embodiment of the present invention, the main beam direction determining device further includes a beam refinement process performing unit configured to perform a beam refinement process of adjusting the determined main beam direction.

A main beam direction determining method according to one aspect of the present invention is a main beam direction determining method of determining one of a first number of primary candidates as a main beam direction to be used for communication by a communication device. The method includes the steps of: selecting a second number of primary candidates or a third number of primary candidates as a secondary candidate or candidates in accordance with a communication quality of the communication by the communication device, the second number being smaller than the first number, the third number being smaller than the second number; and determining one of the secondary candidate or candidates as the main beam direction.

A program according to one aspect of the present invention is a program for causing a computer that determines one of a first number of primary candidates as a main beam direction to be used for communication by a communication device to perform the steps of: selecting a second number of primary candidates or a third number of primary candidates as a secondary candidate or candidates in accordance with a communication quality of the communication by the communication device, the second number being smaller than the first number, the third number being smaller than the second number; and determining one of the secondary candidate or candidates as the main beam direction.

BRIEF DESCRIPTION OF DRAWINGS

FIG. 6 is a diagram illustrating examples of primary candidate sector data.

DESCRIPTION OF EMBODIMENTS

Hereinafter, embodiments of the present invention will be described with reference to the accompanying drawings.

Figure 1:
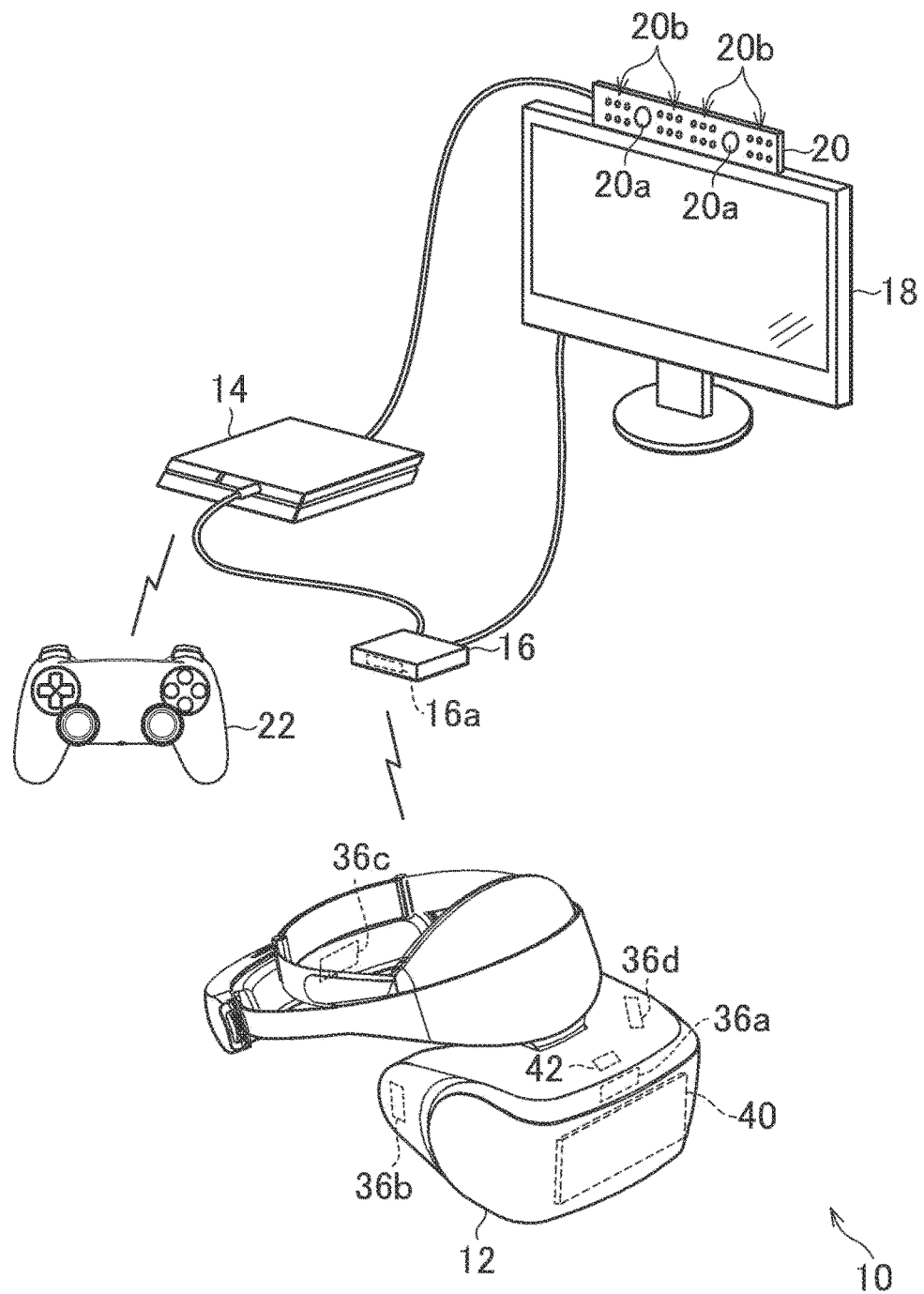
FIG. 1 is a diagram illustrating an example of an overall structure of a video display system according to an embodiment of the present invention.
Figure 2:
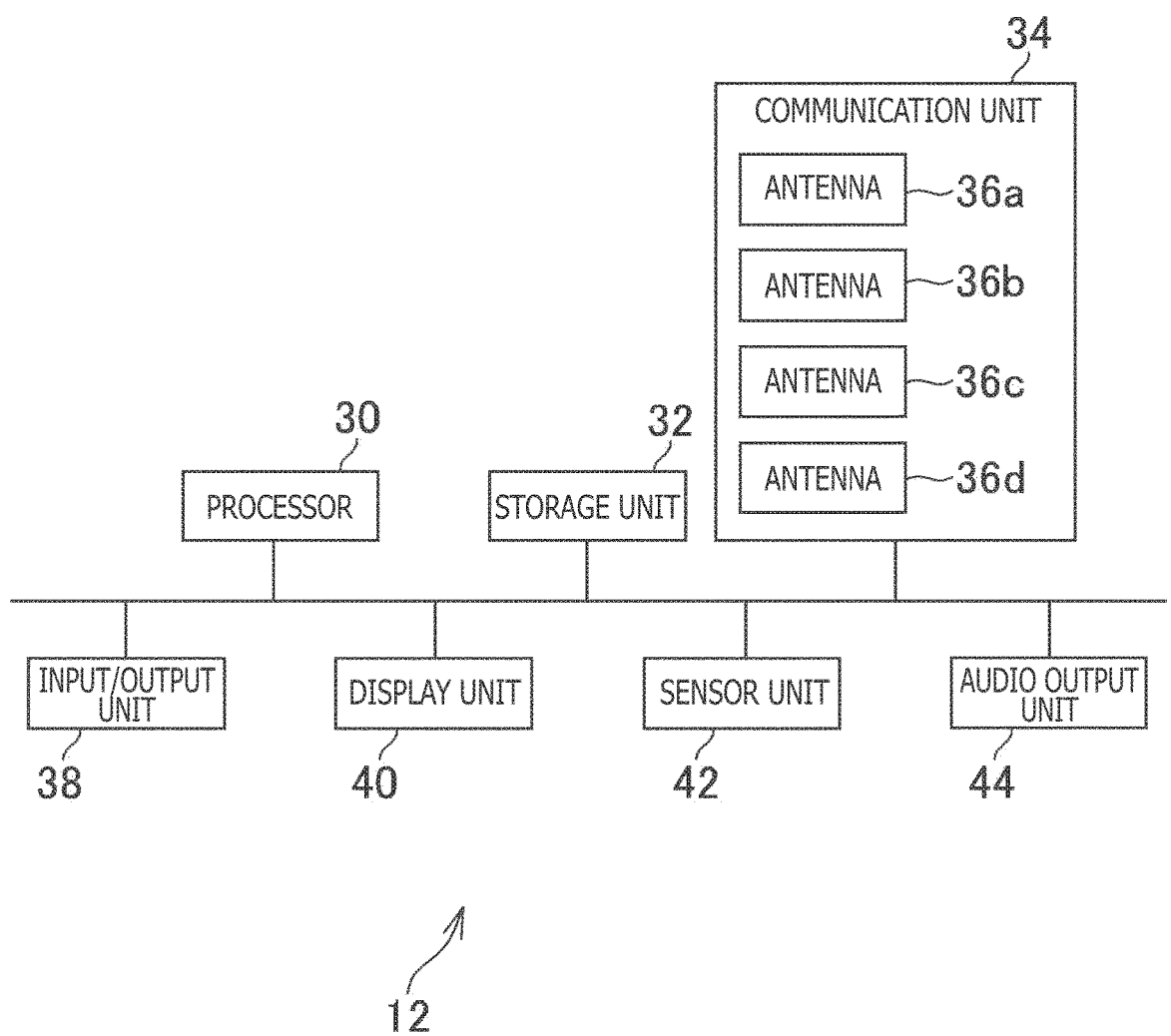
FIG. 2 is a diagram illustrating an example of a configuration of a head-mounted display according to an embodiment of the present invention.

FIG. 1 is a diagram illustrating an example of an overall structure of a video display system 10 according to an embodiment of the present invention. FIG. 2 is a diagram illustrating an example of a configuration of a head-mounted display (HMD) 12 according to the present embodiment.

As illustrated in FIG. 1, the video display system 10 according to the present embodiment includes the HMD 12, an entertainment device 14, a relay device 16, a display 18, a camera/microphone unit 20, and a controller 22.

As illustrated in FIG. 2, the HMD 12 according to the present embodiment includes, for example, a processor 30, a storage unit 32, a communication unit 34, an input/output unit 38, a display unit 40, a sensor unit 42, and an audio output unit 44.

The processor 30 is a program control device, such as a microprocessor, which operates in accordance with a program installed in the HMD 12, for example.

The storage unit 32 is a storage device, such as, for example, a read-only memory (ROM) or a random access memory (RAM). A program executed by the processor 30 and so on are stored in the storage unit 32.

The communication unit 34 is a communication interface, such as a wireless local area network (LAN) module, including a plurality of antennas 36, for example. The communication unit 34 according to the present embodiment includes four antennas 36 (i.e., antennas 36a, 36b, 36c, and 36d). As illustrated in FIG. 1, in the present embodiment, the antenna 36a is disposed at an upper position on a front side of the HMD 12. The antenna 36b is disposed on a right side of the HMD 12. The antenna 36c is disposed on a rear side of the HMD 12. The antenna 36d is disposed on a left side of the HMD 12. In the present embodiment, the four antennas 36 are assumed to form adaptive array antennas. Note that the communication unit 34 may not necessarily include two or more antennas 36, and that the communication unit 34 may alternatively include only one antenna 36, for example.

The input/output unit 38 is an input/output port, such as, for example, a high-definition multimedia interface (HDMI) (registered trademark) port, a universal serial bus (USB) port, or an auxiliary (AUX) port.

The display unit 40 is a display, such as, for example, a liquid crystal display or an organic electroluminescence (EL) display, disposed on the front side of the HMD 12, and causes a picture generated by the entertainment device 14 or the like to be displayed. The display unit 40 is housed in a housing of the HMD 12. The display unit 40 may be configured to, for example, receive a video signal outputted from the entertainment device 14 and relayed by the relay device 16, and output a picture represented by the video signal. The display unit 40 according to the present embodiment is configured to be capable of displaying a three-dimensional image by displaying an image for a left eye and an image for a right eye, for example. Note that the display unit 40 may alternatively be configured to be capable of displaying only two-dimensional images, being incapable of displaying three-dimensional images.

The sensor unit 42 is a sensor, such as, for example, an acceleration sensor or a motion sensor. The sensor unit 42 outputs measuring results of the amount of rotation, the amount of movement, etc., of the HMD 12 to the processor 30 at a predetermined frame rate.

The audio output unit 44 is, for example, headphones, a loudspeaker, or the like, and outputs an audio represented by audio data generated by the entertainment device 14, and so on. The audio output unit 44 receives an audio signal outputted from the entertainment device 14 and relayed by the relay device 16, and outputs an audio represented by the audio signal, for example.

The entertainment device 14 according to the present embodiment is, for example, a computer, such as a game console, a digital versatile disc (DVD) player, or a Blu-ray (registered trademark) player. The entertainment device 14 according to the present embodiment generates a picture and an audio by executing a stored game program or playing a content recorded on an optical disk, for example. Then, the entertainment device 14 according to the present embodiment outputs a video signal representing the generated picture and an audio signal representing the generated audio to the HMD 12 or the display 18 via the relay device 16.

The relay device 16 according to the present embodiment is a computer that relays the video signal and the audio signal outputted from the entertainment device 14 to output the video signal and the audio signal to the HMD 12 or the display 18. The relay device 16 according to the present embodiment includes a communication unit 16a, which is a communication interface, such as a wireless LAN module, containing array antennas.

The display 18 according to the present embodiment is, for example, a liquid crystal display or the like, and causes the picture represented by the video signal outputted from the entertainment device 14 and so on to be displayed.

The camera/microphone unit 20 according to the present embodiment includes, for example, cameras 20a, which output images taken of a subject to the entertainment device 14, and microphones 20b, which take sound in the surroundings, convert the sound to audio data, and output the audio data to the entertainment device 14. The cameras 20a according to the present embodiment form a stereo camera.

The HMD 12 and the relay device 16 are capable of transmission and reception of data therebetween via wireless communication, for example. The entertainment device 14 and the relay device 16 are, for example, connected to each other via an HDMI cable, a USB cable, or the like. The relay device 16 and the display 18 are, for example, connected to each other via an HDMI cable or the like. The entertainment device 14 and the camera/microphone unit 20 are, for example, connected to each other via an AUX cable or the like.

The controller 22 according to the present embodiment is an operation input device used to perform an operation input to the entertainment device 14. A user is able to perform various types of operation inputs using the controller 22, by pressing a directional key or a button included in the controller 22 or tilting an operation stick included therein. Then, in the present embodiment, the controller 22 outputs input data associated with the operation input to the entertainment device 14. In addition, the controller 22 according to the present embodiment includes a USB port. Then, the controller 22 is capable of outputting the input data to the entertainment device 14 in a wired manner when connected to the entertainment device 14 via a USB cable. In addition, the controller 22 according to the present embodiment includes a wireless communication module or the like, and is also capable of outputting the input data to the entertainment device 14 in a wireless manner.

Wireless communication may be performed between the HMD 12 and the relay device 16 using millimeter waves, e.g., those in the 60 GHz band. In the present embodiment, a sufficient communication quality is secured by making an adjustment such that a direction that provides a high communication quality is set as a main beam direction.

A beamforming process is known as an example of a technique for setting the main beam direction. The beamforming process includes a sector level sweep process and a beam refinement process. In the sector level sweep process, the main beam direction, which is used for communication by the HMD 12, is determined from among a plurality of candidates for the main beam direction. Here, for example, out of the plurality of candidates for the main beam direction, a direction that provides a high communication quality, such as a high signal-to-noise ratio (S/N ratio) or a high reception intensity, when communication is performed may be determined as the main beam direction to be used for the communication by the HMD 12. After the main beam direction to be used for the communication by the HMD 12 is determined by the sector level sweep process, the beam refinement process is performed to finely adjust the determined main beam direction. Note that both the sector level sweep process and the beam refinement process are performed by communication (negotiation) between the communication unit 34 of the HMD 12 and the communication unit 16a of the relay device.

Figure 3:
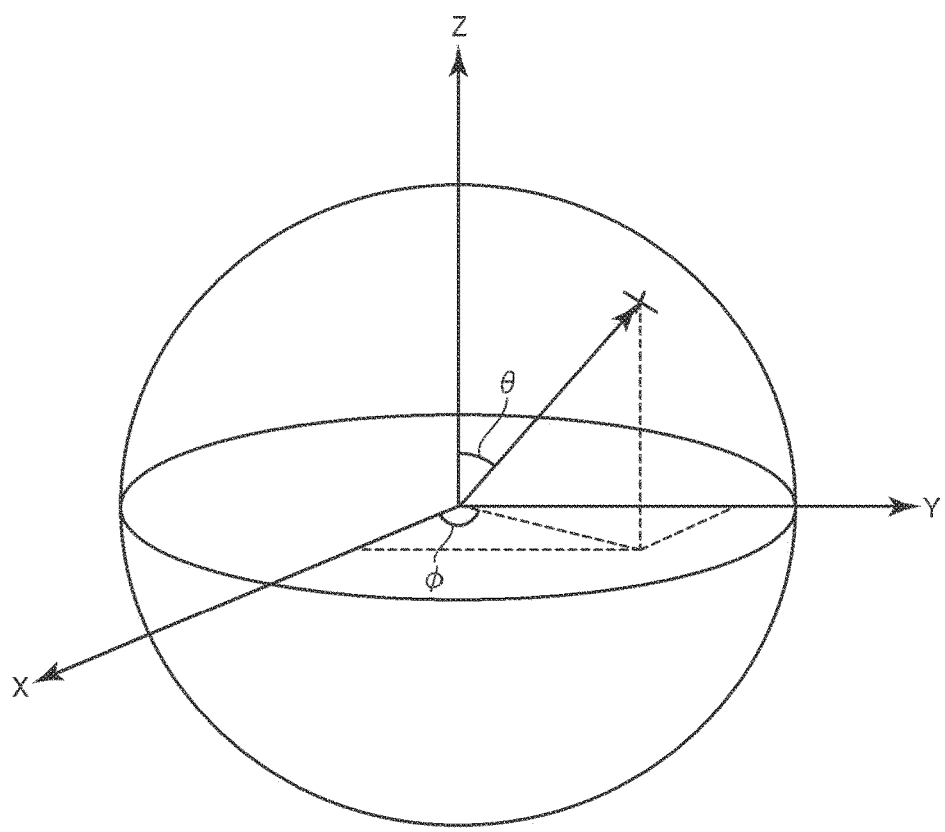
FIG. 3 is a sector candidate diagram schematically illustrating an example of a plurality of candidates for a main beam direction in sector level sweep.
Figure 4:
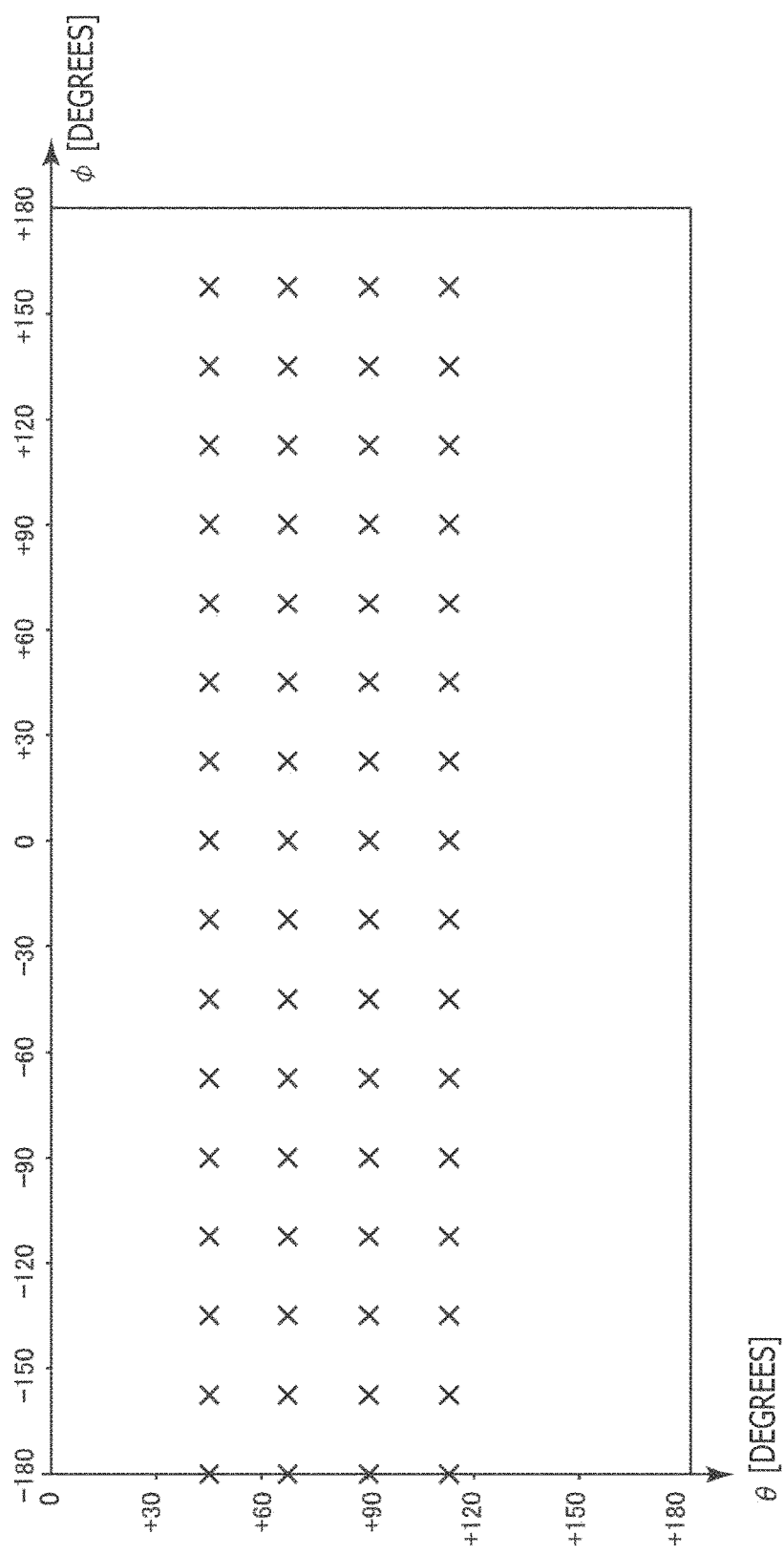
FIG. 4 is an explanatory diagram illustrating an example of correspondences between the main beam direction and a combination of an angle $\varphi$ and an angle $\theta$ in the sector candidate diagram.

FIG. 3 is a sector candidate diagram schematically illustrating an example of the plurality of candidates for the main beam direction in the sector level sweep process. FIG. 4 is an explanatory diagram illustrating an example of correspondences between the main beam direction and a combination of an angle φ and an angle θ in the sector candidate diagram illustrated in FIG. 3.

Each of points represented by an X in the sector candidate diagram illustrated in FIG. 3 represents a sector corresponding to a candidate for the main beam direction in the sector level sweep. Hereinafter, these sectors will be referred to as primary candidate sectors. In the example of FIG. 3, 64 primary candidate sectors are set. Each of these primary candidate sectors is associated with a combination of an angle φ and an angle θ. Hereinafter, the combination of the angle φ and the angle θ will be referred to as a main beam angle parameter (φ, θ).

In the present embodiment, it is assumed, for example, that a direction perpendicular to a surface of the antenna 36a and leading from a back to a front of a head of the user wearing the HMD 12 corresponds to a positive x-axis direction in FIG. 4. It is also assumed that a direction along the surface of the antenna 36a and leading from a right side to a left side of the head of the user wearing the HMD 12 corresponds to a positive y-axis direction in FIG. 4. It is also assumed that a direction along the surface of the antenna 36a and corresponding to a direction rotated 90 degrees in a counterclockwise direction from the positive y-axis direction as viewed from the positive x-axis direction corresponds to a positive z-axis direction. In addition, in the present embodiment, it is assumed that the angle φ is an angle from an x-axis with the counterclockwise direction being a positive direction as viewed from the positive z-axis direction, as illustrated in FIG. 4. It is also assumed that the angle θ is an angle formed with the positive z-axis direction. For example, a main beam angle parameter (γ, θ) corresponding to the positive x-axis direction is (θ, +90). In the present embodiment, it is assumed that values of the main beam angle parameter are in degrees. In the present embodiment, it is also assumed that −180≤φ<+180 and 0≤θ≤180.

In a known sector level sweep process, a negotiation is typically performed between the HMD 12 and the relay device 16. In addition, in the negotiation, with respect to each of all the 64 primary candidate sectors arranged in the sector candidate diagram, a communication quality of a communication performed with a direction associated with that primary candidate sector set as the main beam direction is checked. Then, the direction associated with the primary candidate sector that has provided the highest communication quality is determined as the main beam direction.

In contrast, in the present embodiment, two types of sector level sweep processes, a first sector level sweep process and a second sector level sweep process, are performed. The first sector level sweep process is performed at a predetermined timing, such as, for example, a timing defined by a beacon interval. Here, the first sector level sweep process may be performed at intervals of a predetermined time. Meanwhile, the second sector level sweep process is performed as appropriate in response to a deterioration in communication quality, even at a timing that is not a timing at which the first sector level sweep is to be performed.

In the second sector level sweep process, with respect to, for example, each of the 64 primary candidate sectors arranged in the sector candidate diagram, a communication quality of a communication performed with the direction associated with that primary candidate sector set as the main beam direction is checked, as in the known sector level sweep. Then, the direction associated with the primary candidate sector that has provided the highest communication quality is determined as the main beam direction.

Meanwhile, in the first sector level sweep process, the sector level sweep process is performed with respect to only some of the primary candidate sectors. Therefore, a beamforming process including the first sector level sweep process may require less time to determine the main beam direction than a known beamforming process.

Hereinafter, functions of the HMD 12 according to the present embodiment and processes performed in the HMD 12 according to the present embodiment will be further described. The HMD 12 according to the present embodiment performs both a role as a main beam direction determining device that determines one of a plurality of primary candidates as a main beam direction to be used for communication by a communication device, and a role as a communication device that communicates with the relay device 16.

Figure 5:
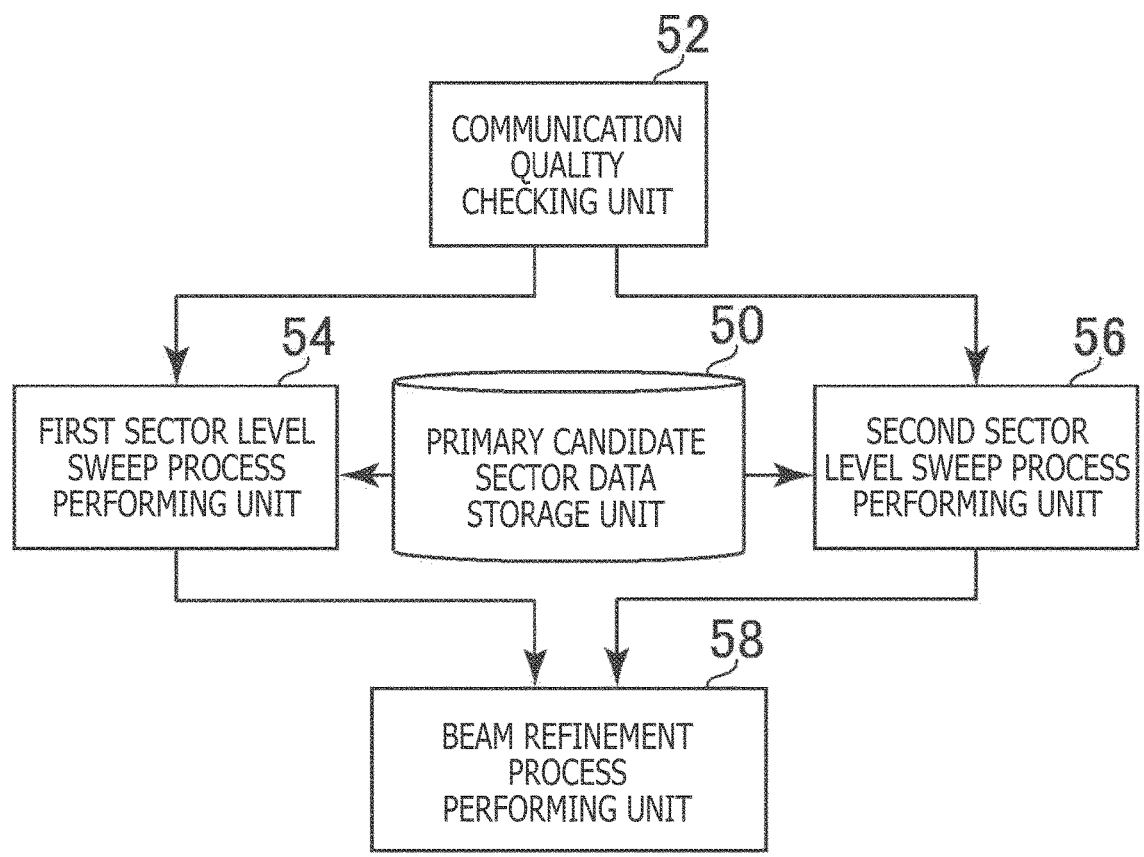
FIG. 5 is a functional block diagram illustrating examples of functions implemented by the head-mounted display according to an embodiment of the present invention.

FIG. 5 is a functional block diagram illustrating examples of functions implemented by the HMD 12 according to the present embodiment. Note that the HMD 12 according to the present embodiment may not necessarily implement all of the functions illustrated in FIG. 5, and also may implement a function other than the functions illustrated in FIG. 5.

As illustrated in FIG. 5, the HMD 12 according to the present embodiment includes, in terms of function, for example, a primary candidate sector data storage unit 50, a communication quality checking unit 52, a first sector level sweep process performing unit 54, a second sector level sweep process performing unit 56, and a beam refinement process performing unit 58. The primary candidate sector data storage unit 50 is mainly implemented by the storage unit 32. Each of the communication quality checking unit 52, the first sector level sweep process performing unit 54, the second sector level sweep process performing unit 56, and the beam refinement process performing unit 58 is mainly implemented by the processor 30 and the communication unit 34.

The above functions may be implemented by the processor 30 executing a program installed in the HMD 12, which is a computer, the program containing commands corresponding to the above functions. This program is supplied to the HMD 12, for example, through a computer-readable information storage medium, such as an optical disk, a magnetic disk, a magnetic tape, a magneto-optical disk, or a flash memory, or through the Internet or the like.

In the present embodiment, the primary candidate sector data storage unit 50 stores primary candidate sector data representing the primary candidate sector, for example. The primary candidate sector data according to the present embodiment includes, for example, a primary candidate sector identification (ID), which is identification information for the primary candidate sector data, and the above-described main beam angle parameter $(\varphi, \theta)$, as illustrated in FIG. 6. In the present embodiment, the primary candidate sector data storage unit 50 stores a plurality of items of primary candidate sector data as illustrated in FIG. 6. In the example of FIG. 6, 64 items of primary candidate sector data are illustrated. The primary candidate sector represented by the primary candidate sector data is associated with an angle with respect to a reference direction (e.g., the positive x-axis direction) by the main beam angle parameter $(\varphi, \theta)$.

In the present embodiment, the communication quality checking unit 52 checks the communication quality of the communication by the HMD 12, for example. As mentioned above, the communication quality checking unit 52 may check, for example, the signal-to-noise ratio (S/N ratio), the reception intensity, or the like in the communication by the communication unit 34.

In the present embodiment, the first sector level sweep process performing unit 54 performs the first sector level sweep process at the predetermined timing to determine the main beam direction of the HMD 12, for example. Here, the first sector level sweep process may be performed at a timing defined by the beacon interval, for example.

In the present embodiment, the first sector level sweep process performing unit 54 performs the sector level sweep process with respect to the main beam direction currently used for the communication by the HMD 12, for example. In this case, the main beam direction currently used for the communication by the HMD 12 is determined again as the main beam direction to be used for the communication by the HMD 12.

Here, the first sector level sweep process performing unit 54 may refer to the primary candidate sector data stored in the primary candidate sector data storage unit 50, and identify the main beam direction currently used for the communication by the HMD 12. In the present embodiment, it is assumed that, when the first sector level sweep process is performed, the orientation and position of the HMD 12 have not significantly changed since an immediately previous iteration of the first sector level sweep process. On this assumption, the primary candidate sector data the same as the primary candidate sector data corresponding to the main beam direction currently used for the communication by the HMD 12 may be determined again as the primary candidate sector data corresponding to the main beam direction to be used for the communication by the HMD 12, for example.

In the present embodiment, the second sector level sweep process performing unit 56 performs the second sector level sweep process in response to a deterioration in the communication quality of the communication by the HMD 12, for example. Here, the second sector level sweep process may be performed when a communication quality obtained by the checking by the communication quality checking unit 52 is lower than a predetermined communication quality, even at a timing that is not a timing at which the first sector level sweep process is to be performed, for example.

In the present embodiment, the second sector level sweep process performing unit 56 checks a communication quality of a communication performed with each of a first number of primary candidate sectors set as the main beam direction, for example. Hereinafter, the above first number of primary candidate sectors will be referred to as N1 primary candidate sectors. Then, the second sector level sweep process performing unit 56 determines the main beam direction that has provided the highest communication quality, for example, as the main beam direction to be used for the communication by the HMD 12. Here, the second sector level sweep process may be performed, for example, with respect to each of the 64 primary candidate sectors associated with the respective items of primary candidate sector data stored in the primary candidate sector data storage unit 50. In this case, the above number, N1, is 64. Note that the second sector level sweep process may not necessarily be performed with respect to all of the primary candidate sectors associated with the respective items of primary candidate sector data stored in the primary candidate sector data storage unit 50. For example, the second sector level sweep process may be performed with respect to only some of the primary candidate sectors.

The beam refinement process performing unit 58 performs a beam refinement process of finely adjusting the main beam direction determined by the first sector level sweep process performing unit 54 or the second sector level sweep process performing unit 56.

Hereinafter, an example procedure of processing performed in the HMD 12 according to the present embodiment will be described with reference to a flowchart illustrated in FIG. 7. It is assumed that, in the present example procedure, a loop of processes of S101 to S105 below is repeatedly performed, for example.

First, the communication quality checking unit 52 checks the communication quality of the communication by the HMD 12, and checks whether or not a communication quality obtained by the checking is lower than a predetermined quality (S101).

If it is determined that the communication quality obtained is not lower than the predetermined quality (S101: N), the first sector level sweep process performing unit 54 checks whether or not the predetermined timing, such as a timing defined by the beacon interval, has arrived (S102). If it is not determined that the predetermined timing has arrived (S102: N), control returns to the process of S101. Meanwhile, if it is determined that the predetermined timing has arrived (S102: Y), the first sector level sweep process performing unit 54 performs the first sector level sweep process with respect to the main beam direction currently used for the communication by the HMD 12 (S103).

Meanwhile, if it is determined in the process of S101 that the communication quality obtained is lower than the predetermined quality (S101: Y), the second sector level sweep process performing unit 56 performs the second sector level sweep process with respect to each of the N1 primary candidate sectors (S104). In the process of S104, the communication quality of the communication performed with each of the N1 primary candidate sectors set as the main beam direction is checked, for example. Then, the main beam direction that has provided the highest communication quality, for example, is determined as the main beam direction to be used for the communication by the HMD 12.

Then, after the process of S103 or the process of S104 is finished, the beam refinement process performing unit 58 performs the beam refinement process (S105), i.e., a process of finely adjusting the main beam direction determined by the process of S103 or S104, and control returns to the process of S101.

Thus, as mentioned above, the loop of the processes of S101 to S105 is repeatedly performed.

Figure 7:
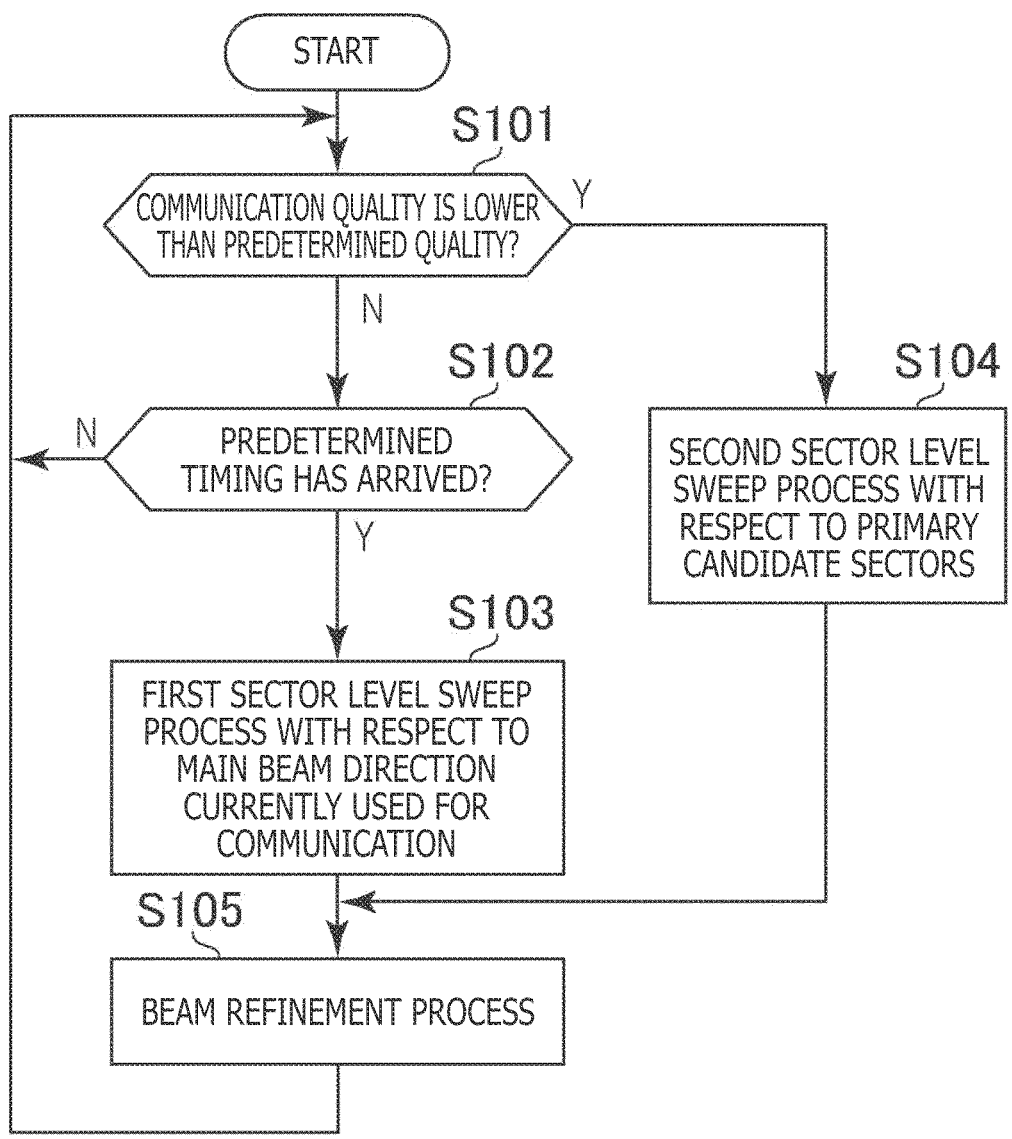
FIG. 7 is a flowchart illustrating an example procedure of processing performed in the head-mounted display according to an embodiment of the present invention.

In the example procedure illustrated in FIG. 7, the first sector level sweep process is performed with respect to only the main beam direction currently used for the communication by the HMD 12. Therefore, the example procedure illustrated in FIG. 7 may require less time to determine the main beam direction than the known beamforming process.

Note that the above process of S103 may not necessarily be performed. Then, in this case, the beam refinement process may be performed with respect to the main beam direction currently used for the communication in the process of S105.

Also note that, in the above process of S103, the first sector level sweep process may alternatively be performed with respect to two or more of the primary candidate sectors. In this case, the main beam direction that has provided the highest communication quality may be determined as the main beam direction to be used for the communication by the HMD 12.

Also note that, in the above process of S104, the second sector level sweep process may alternatively be performed with respect to only some of the primary candidate sectors. Also note that, in the above process of S104, the second sector level sweep process may alternatively be performed with respect to only that number of sectors which matches the communication quality obtained by the checking in the process of S101. Here, the second sector level sweep process may be performed with respect to a greater number of sectors as the communication quality obtained by the checking in the process of S101 is lower, for example.

Figure 8:
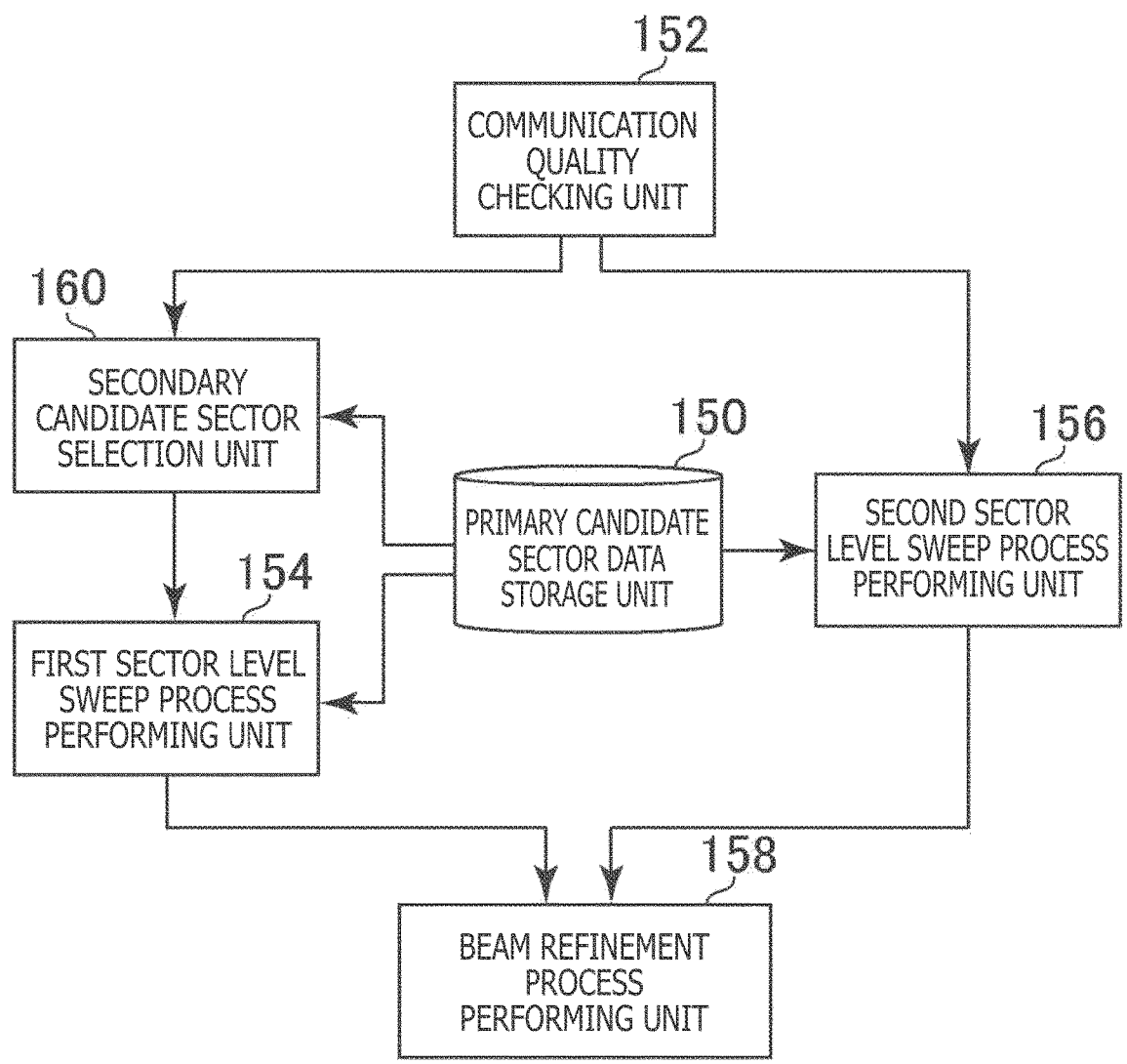
FIG. 8 is a functional block diagram illustrating examples of functions implemented by a head-mounted display according to a first modification of the above embodiment of the present invention.

FIG. 8 is a functional block diagram illustrating examples of functions implemented by an HMD 12 according to a first modification of the present embodiment. Note that the HMD 12 according to the first modification may not necessarily implement all of the functions illustrated in FIG. 8, and also may implement a function other than the functions illustrated in FIG. 8.

As illustrated in FIG. 8, the HMD 12 according to the first modification includes, in terms of function, for example, a primary candidate sector data storage unit 150, a communication quality checking unit 152, a first sector level sweep process performing unit 154, a second sector level sweep process performing unit 156, a beam refinement process performing unit 158, and a secondary candidate sector selection unit 160. The primary candidate sector data storage unit 150 is mainly implemented by the storage unit 32. Each of the communication quality checking unit 152, the first sector level sweep process performing unit 154, the second sector level sweep process performing unit 156, and the beam refinement process performing unit 158 is mainly implemented by the processor 30 and the communication unit 34. The secondary candidate sector selection unit 160 is mainly implemented by the processor 30.

The above functions may be implemented by the processor 30 executing a program installed in the HMD 12, which is a computer, the program containing commands corresponding to the above functions. This program is supplied to the HMD 12, for example, through a computer-readable information storage medium, such as an optical disk, a magnetic disk, a magnetic tape, a magneto-optical disk, or a flash memory, or through the Internet or the like.

The functions of the primary candidate sector data storage unit 150, the communication quality checking unit 152, the second sector level sweep process performing unit 156, and the beam refinement process performing unit 158 illustrated in FIG. 8 are similar to the functions of the primary candidate sector data storage unit 50, the communication quality checking unit 52, the second sector level sweep process performing unit 56, and the beam refinement process performing unit 58, respectively, illustrated in FIG. 5, and, therefore, will not be described below.

In the first modification, the communication quality checking unit 152 may, for example, check a value (i.e., an index number) of modulation and coding schemes (MCS), which indicates a modulation scheme and a coding scheme used in the communication by the HMD 12.

In the first modification, the secondary candidate sector selection unit 160, for example, selects some of the primary candidate sectors as a secondary candidate sector or sectors. Here, for example, a second number (which is smaller than the aforementioned first number) of primary candidates or a third number (which is smaller than the second number) of primary candidates may be selected as the secondary candidates in accordance with the communication quality of the communication by the HMD 12 at the timing of the selection.

Here, for example, the second number of primary candidate sectors, the second number being smaller than the aforementioned number, N1, may be selected as the secondary candidate sectors when the value of MCS obtained by the checking is smaller than a predetermined threshold value t1. Hereinafter, the second number of primary candidate sectors will be referred to as N2 primary candidate sectors.

In this case, the secondary candidate sector selection unit 160 may select the secondary candidate sectors on the basis of the main beam direction currently used for the communication by the HMD 12, for example. For example, the secondary candidate sectors may be selected in accordance with smallness of an angle formed by the direction associated with each primary candidate sector with the main beam direction currently used for the communication by the HMD 12.

Suppose, for example, that values of the main beam angle parameter corresponding to the main beam direction currently used for the communication by the HMD 12 are ($\varphi$1, $\theta$1). In this case, primary candidate sector data with values ($\varphi$, $\theta$) of the main beam angle parameter satisfying conditions, $\varphi1-\Delta\varphi \leq \varphi \leq \varphi1+\Delta\varphi$ and $\theta1-\Delta\theta \leq \theta \leq \theta1+\Delta\theta$, may be selected as secondary candidate sector data representing a secondary candidate sector. It is assumed that $\Delta\varphi$ represents a predetermined threshold value for the angle $\varphi$, and $\Delta\theta$ represents a predetermined threshold value for the angle $\theta$. Note that a method for selecting the secondary candidate sector data is not limited to the above example. For example, with respect to each of all items of primary candidate sector data, a value associated with a difference between the direction associated with that item of primary candidate sector data and the main beam direction currently used for the communication by the HMD 12 may be calculated. For example, with respect to the primary candidate sector data, the values of the main beam angle parameter of which are ($\varphi$, $\theta$), the value of $(\varphi-\varphi1)^2+(\theta-\theta1)^2$ may be calculated. Then, a predetermined number of items of primary candidate sector data that have provided the smallest calculated values may be selected as items of secondary candidate sector data each representing a secondary candidate sector.

In addition, when the value of MCS obtained by the checking is equal to or greater than the predetermined threshold value t1, the third number of primary candidate sectors, the third number being still smaller than the aforementioned number, N2, may be selected as the secondary candidate sectors, for example. Hereinafter, the third number of primary candidate sectors will be referred to as N3 primary candidate sectors. Here, only one sector may be selected as the secondary candidate sector, for example. For example, as mentioned above, the sector corresponding to the main beam direction currently used for the communication by the HMD 12 may be selected as the secondary candidate sector.

In the first modification, the first sector level sweep process performing unit 154 may, for example, perform the first sector level sweep process with respect to each of the secondary candidate sectors selected by the secondary candidate sector selection unit 160 to determine the main beam direction to be used for the communication by the HMD 12. For example, the first sector level sweep process may be performed with respect to each of the directions associated with the respective items of secondary candidate sector data selected by the secondary candidate sector selection unit 160. Here, when the number of secondary candidate sectors selected is two or more, for example, one of the two or more secondary candidate sectors may be determined as the main beam direction on the basis of a communication quality of a communication performed with each of the two or more secondary candidate sectors. For example, the main beam direction corresponding to the one of the two or more secondary candidate sectors that has provided the highest communication quality may be determined as the main beam direction to be used for the communication by the HMD 12. Meanwhile, when the number of secondary candidate sectors selected is one, the one secondary candidate sector may be determined as the main beam direction to be used for the communication by the HMD 12.

Figure 9:
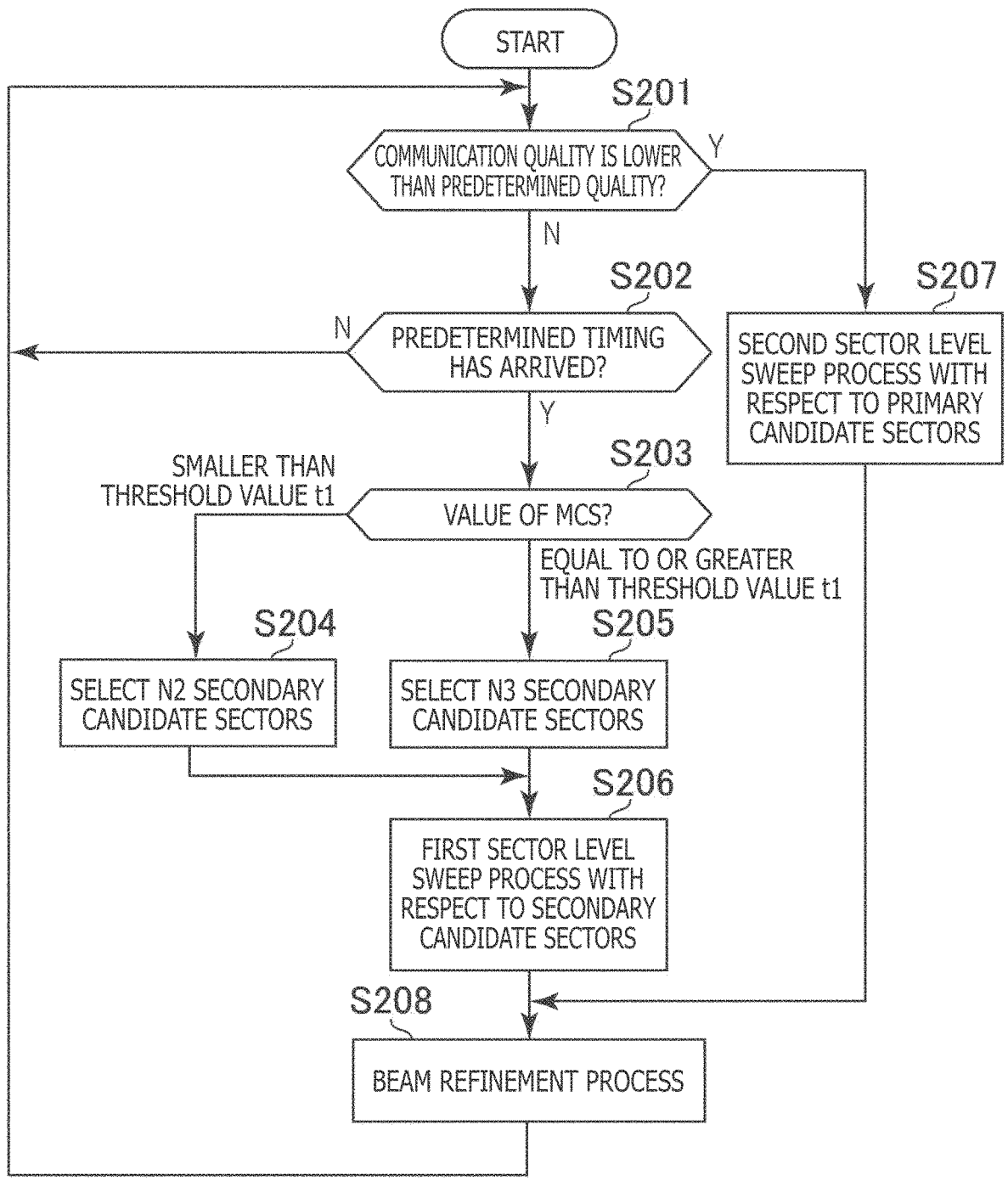
FIG. 9 is a flowchart illustrating an example procedure of processing performed in the head-mounted display according to the first modification of the above embodiment of the present invention.

Hereinafter, an example procedure of processing performed in the HMD 12 according to the first modification will be described with reference to a flowchart illustrated in FIG. 9. It is assumed that, in the present example procedure, a loop of processes of S201 to S208 below is repeatedly performed, for example.

First, the communication quality checking unit 152 checks the communication quality of the communication by the HMD 12, and checks whether or not a communication quality obtained by the checking is lower than the predetermined quality (S201).

If it is determined that the communication quality obtained is not lower than the predetermined quality (S201: N), the first sector level sweep process performing unit 154 checks whether or not the predetermined timing, such as a timing defined by the beacon interval, has arrived (S202). If it is not determined that the predetermined timing has arrived (S202: N), control returns to the process of S201.

Meanwhile, if it is determined that the predetermined timing has arrived (S202: Y), the communication quality checking unit 152 checks the value of MCS, which indicates the modulation scheme and the coding scheme used in the communication by the HMD 12 (S203).

If the value of MCS obtained by the checking in the process of S203 is smaller than the threshold value t1, the secondary candidate sector selection unit 160 selects N2 secondary candidate sectors from among the first candidate sectors as described above (S204). Meanwhile, if the value of MCS obtained by the checking in the process of S203 is equal to or greater than the threshold value t1, the secondary candidate sector selection unit 160 selects N3 secondary candidate sectors from among the first candidate sectors as described above (S205). Here, for example, the secondary candidate sector corresponding to the main beam direction currently used for the communication by the HMD 12 may be selected.

Then, the first sector level sweep process performing unit 154 performs the first sector level sweep process with respect to each of the secondary candidate sectors selected by the process of S204 or S205, and determines the main beam direction to be used for the communication by the HMD 12 (S206).

If it is determined in the process of S201 that the communication quality obtained is lower than the predetermined quality (S201: Y), the second sector level sweep process performing unit 156 performs the second sector level sweep process with respect to each of the N1 primary candidate sectors (S207). In the process of S207, the communication quality of the communication performed with each of the N1 primary candidate sectors set as the main beam direction is checked, for example. Then, the main beam direction that has provided the highest communication quality, for example, is determined as the main beam direction to be used for the communication by the HMD 12.

Then, after the process of S206 or the process of S207 is finished, the beam refinement process performing unit 158 performs the beam refinement process (S208), i.e., a process of finely adjusting the main beam direction determined by the process of S206 or S207, and control returns to the process of S201.

Thus, as mentioned above, the loop of the processes of S201 to S208 is repeatedly performed.

In the first modification, the first sector level sweep process is performed with respect to the sectors selected as the secondary candidate sectors from among the primary candidate sectors. Therefore, according to the first modification, less time may be required to determine the main beam direction than in the case of the known beamforming process.

Note that, in the first modification, one of the antennas 36 may be associated with each item of primary candidate sector data stored in the primary candidate sector data storage unit 150. Here, for example, with each item of primary candidate sector data may be associated one of the antennas 36 that is used to check the communication quality of the communication performed with the direction corresponding to that item of primary candidate sector data set as the main beam direction in the sector level sweep process. Alternatively, for example, with each item of primary candidate sector data may be associated one of the antennas 36 that is used for the communication by the HMD 12 when the direction corresponding to that item of primary candidate sector data is the main beam direction in the communication by the HMD 12.

Then, in this case, the secondary candidate sector selection unit 160 may identify the antenna 36 associated with the main beam direction currently used for the communication by the HMD 12. Then, the secondary candidate sector selection unit 160 may select items of primary candidate sector data associated with the identified antenna 36 as the secondary candidate sector data associated with the secondary candidate sectors.

Even in this case, the first sector level sweep process is performed with respect to the sectors selected as the secondary candidate sectors from among the primary candidate sectors, and therefore, less time may be required to determine the main beam direction than in the case of the known beamforming process.

Note that one of three or more numbers of secondary candidate sectors may be selected in accordance with the value of MCS obtained by the checking in the above process of S203. For example, when the value of MCS obtained by the checking in the process of S203 is smaller than a threshold value t2, which is smaller than the aforementioned value t1, N4 secondary candidate sectors, N4 being a number greater than the aforementioned number N2 and smaller than the aforementioned number N1, may be selected. When the value of MCS obtained by the checking in the process of S203 is equal to or greater than the threshold value t2 and smaller than the threshold value t1, N2 secondary candidate sectors may be selected. When the value of MCS obtained by the checking in the process of S203 is equal to or greater than the threshold value t1, N3 secondary candidate sectors may be selected.

Also note that, in the case where only one secondary candidate sector is selected in the above process of S205, the process of S206 may not be performed. Then, in this case, the beam refinement process may be performed with respect to the main beam direction associated with the selected secondary candidate sector in the process of S208.

Also note that, in the above process of S207, the second sector level sweep process may alternatively be performed with respect to only some of the primary candidate sectors. In this case, the second sector level sweep process may be performed with respect to a greater number of sectors than the number of secondary candidate sectors. Also note that, in the above process of S207, the second sector level sweep process may alternatively be performed with respect to only that number of sectors which matches the communication quality obtained by the checking in the process of S201. Here, the second sector level sweep process may be performed with respect to a greater number of sectors as the communication quality obtained by the checking in the process of S201 is lower, for example.

Figure 10:
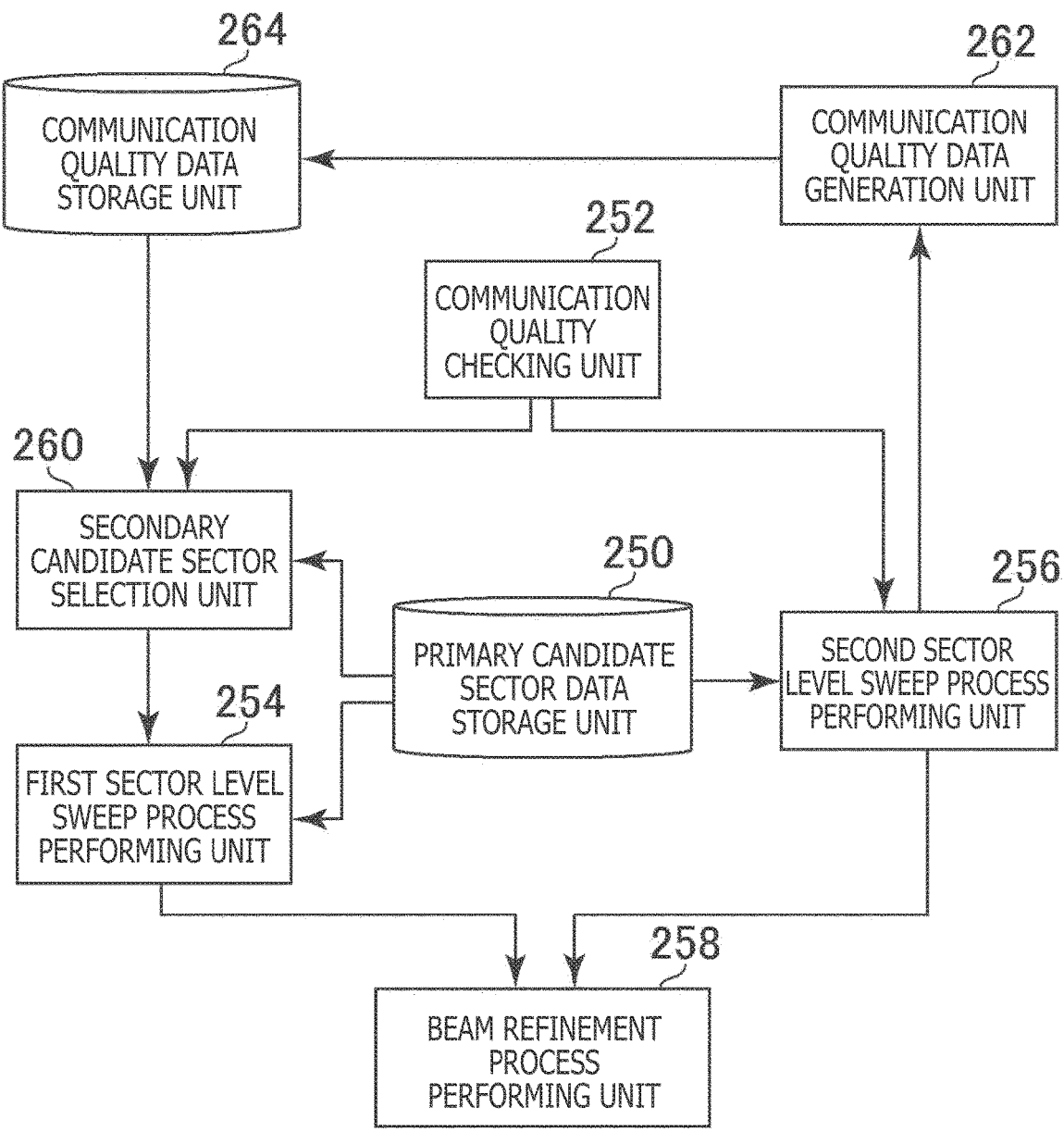
FIG. 10 is a flowchart illustrating an example procedure of processing performed in a head-mounted display according to a second modification of the above embodiment of the present invention.

FIG. 10 is a functional block diagram illustrating examples of functions implemented by an HMD 12 according to a second modification of the present embodiment. Note that the HMD 12 according to the second modification may not necessarily implement all of the functions illustrated in FIG. 10, and also may implement a function other than the functions illustrated in FIG. 10.

As illustrated in FIG. 10, the HMD 12 according to the second modification includes, in terms of function, for example, a primary candidate sector data storage unit 250, a communication quality checking unit 252, a first sector level sweep process performing unit 254, a second sector level sweep process performing unit 256, a beam refinement process performing unit 258, a secondary candidate sector selection unit 260, a communication quality data generation unit 262, and a communication quality data storage unit 264. Each of the primary candidate sector data storage unit 250 and the communication quality data storage unit 264 is mainly implemented by the storage unit 32. Each of the communication quality checking unit 252, the first sector level sweep process performing unit 254, the second sector level sweep process performing unit 256, the beam refinement process performing unit 258, and the communication quality data generation unit 262 is mainly implemented by the processor 30 and the communication unit 34. The secondary candidate sector selection unit 260 is mainly implemented by the processor 30.

The above functions may be implemented by the processor 30 executing a program installed in the HMD 12, which is a computer, the program containing commands corresponding to the above functions. This program is supplied to the HMD 12, for example, through a computer-readable information storage medium, such as an optical disk, a magnetic disk, a magnetic tape, a magneto-optical disk, or a flash memory, or through the Internet or the like.

The functions of the primary candidate sector data storage unit 250, the communication quality checking unit 252, the first sector level sweep process performing unit 254, the second sector level sweep process performing unit 256, the beam refinement process performing unit 258, and the secondary candidate sector selection unit 260 illustrated in FIG. 10 are similar to the functions of the primary candidate sector data storage unit 150, the communication quality checking unit 152, the first sector level sweep process performing unit 154, the second sector level sweep process performing unit 156, the beam refinement process performing unit 158, and the secondary candidate sector selection unit 160, respectively, illustrated in FIG. 8, and, therefore, will not be described below.

In the second modification, the communication quality data generation unit 262, for example, generates communication quality data indicating a communication quality of a communication performed with a direction associated with each of the first candidate sectors set as the main beam direction. Here, for example, communication quality data indicating a communication quality when the second sector level sweep process was performed may be generated. With the communication quality data may be associated a first candidate sector ID associated with a first candidate sector with respect to which the communication quality was checked, and time data indicating a time at which the communication quality was checked.

Then, in the second modification, the communication quality data storage unit 264, for example, stores the communication quality data generated by the communication quality data generation unit 262.

In the second modification, the secondary candidate sector selection unit 260 may, for example, select the secondary candidate sectors on the basis of past communication qualities associated with the respective first candidate sectors and indicated by the communication quality data stored in the communication quality data storage unit 264. Here, for example, a predetermined number of primary candidate sectors that have provided the highest communication qualities in an immediately previous iteration of the second sector level sweep process may be selected as the secondary candidate sector(s).

Figure 11:
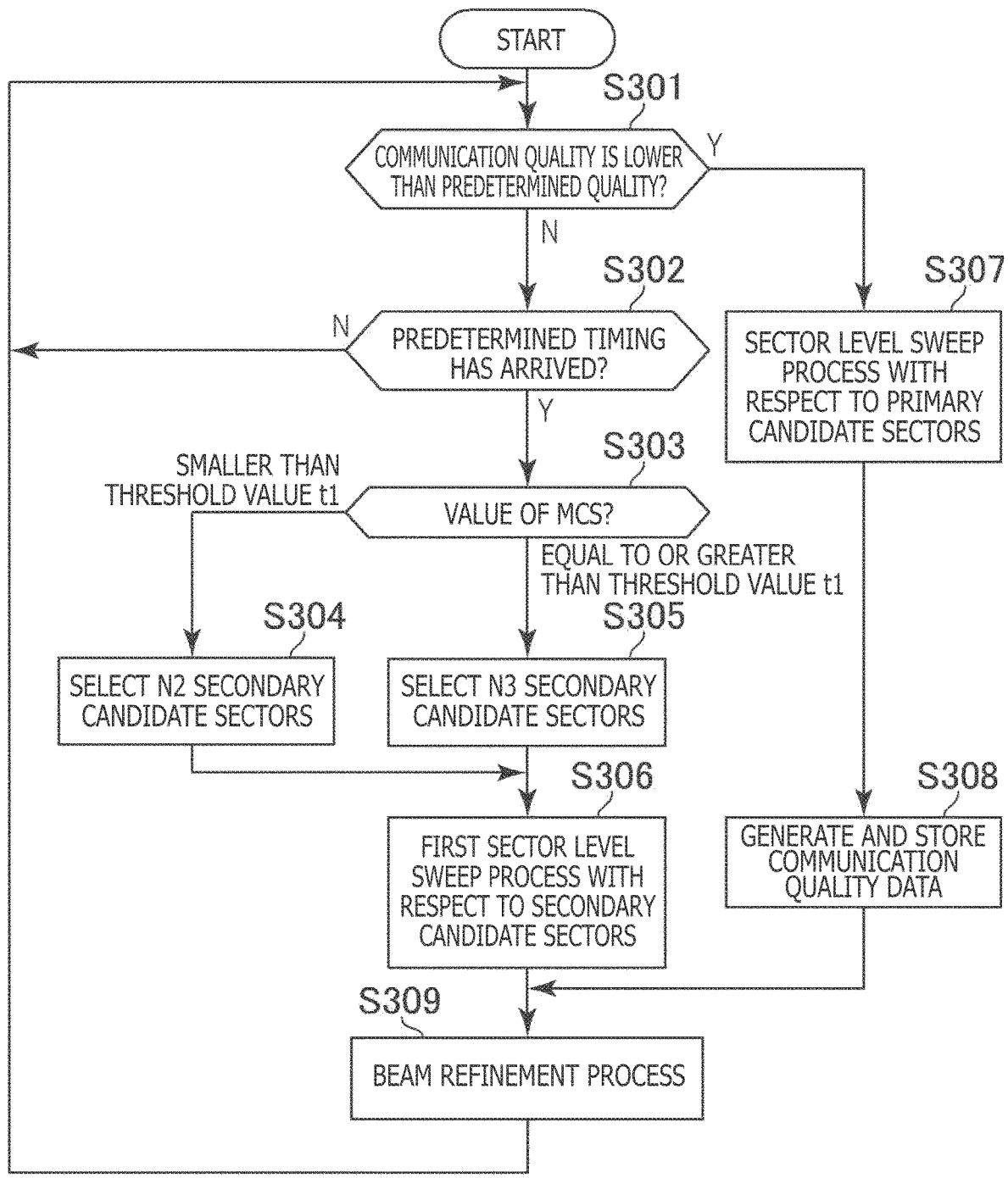
FIG. 11 is a flowchart illustrating an example procedure of processing performed in the head-mounted display according to the second modification of the above embodiment of the present invention.

Hereinafter, an example procedure of processing performed in the HMD 12 according to the second modification will be described with reference to a flowchart illustrated in FIG. 11. It is assumed that, in the present example procedure, a loop of processes of S301 to S309 below is repeatedly performed, for example.

First, the communication quality checking unit 252 checks the communication quality of the communication by the HMD 12, and checks whether or not a communication quality obtained by the checking is lower than the predetermined quality (S301).

If it is determined that the communication quality obtained is not lower than the predetermined quality (S301: N), the first sector level sweep process performing unit 254 checks whether or not the predetermined timing, such as a timing defined by the beacon interval, has arrived (S302). If it is not determined that the predetermined timing has arrived (S302: N), control returns to the process of S301.

Meanwhile, if it is determined that the predetermined timing has arrived (S302: Y), the communication quality checking unit 252 checks the value of MCS, which indicates the modulation scheme and the coding scheme used in the communication by the HMD 12 (S303).

If the value of MCS obtained by the checking in the process of S303 is smaller than the threshold value t1, the secondary candidate sector selection unit 260 selects N2 secondary candidate sectors from among the first candidate sectors on the basis of the past communication qualities associated with the respective primary candidate sectors (S304). Here, for example, the N2 secondary candidate sectors may be selected on the basis of the communication quality data stored in the communication quality data storage unit 264. For example, N2 sectors that have provided the highest communication qualities in the immediately previous iteration of the second sector level sweep process may be selected as the secondary candidate sectors from among the N1 primary candidate sectors. Meanwhile, if the value of MCS obtained by the checking in the process of S303 is equal to or greater than the threshold value t1, the secondary candidate sector selection unit 260 selects N3 secondary candidate sectors from among the first candidate sectors (S305). Here, the secondary candidate sector corresponding to the main beam direction currently used for the communication by the HMD 12 may be selected, for example.

Then, the first sector level sweep process performing unit 254 performs the first sector level sweep process with respect to each of the secondary candidate sectors selected by the process of S304 or S305, and determines the main beam direction to be used for the communication by the HMD 12 (S306).

Meanwhile, if it is determined in the process of S301 that the communication quality obtained is lower than the predetermined quality (S301: Y), the second sector level sweep process performing unit 256 performs the second sector level sweep process with respect to each of the N1 primary candidate sectors (S307). In the process of S307, the communication quality of the communication performed with each of the N1 primary candidate sectors set as the main beam direction is checked, for example. Then, the main beam direction that has provided the highest communication quality, for example, is determined as the main beam direction to be used for the communication by the HMD 12.

Then, the communication quality data generation unit 262 generates items of communication quality data indicating communication qualities obtained by the checking in the process of S307, and causes the generated communication quality data to be stored in the communication quality data storage unit 264 (S308).

Then, after the process of S306 or the process of S308 is finished, the beam refinement process performing unit 258 performs the beam refinement process (S309), i.e., a process of finely adjusting the main beam direction determined by the process of S306 or S307, and control returns to the process of S301.

Thus, as mentioned above, the loop of the processes of S301 to S309 is repeatedly performed.

Also in the second modification, the first sector level sweep process is performed with respect to the sectors selected as the secondary candidate sectors from among the primary candidate sectors. Therefore, according to the second modification, less time may be required to determine the main beam direction than in the case of the known beamforming process.

Note that, in the second modification, the communication quality data generation unit 262 may generate communication quality data associated with respect to any relevant second candidate sector when the first sector level sweep process is performed as well. Then, the generated communication quality data may be stored in the communication quality data storage unit 264. Then, in this case, the second candidate sectors may be selected on the basis of the communication qualities in the first sector level sweep process.

Note that, as in the first modification, one of three or more numbers of secondary candidate sectors may be selected in accordance with the value of MCS obtained by the checking in the above process of S303.

Also note that, in the case where only one secondary candidate sector is selected in the above process of S305, the process of S306 may not be performed. Then, in this case, the beam refinement process may be performed with respect to the main beam direction associated with the selected secondary candidate sector in the process of S309.

Also note that, in the above process of S307, the second sector level sweep process may alternatively be performed with respect to only some of the primary candidate sectors. In this case, the second sector level sweep process may be performed with respect to a greater number of sectors than the number of secondary candidate sectors. Also note that, in the above process of S307, the second sector level sweep process may alternatively be performed with respect to only that number of sectors which matches the communication quality obtained by the checking in the process of S301. Here, the second sector level sweep process may be performed with respect to a greater number of sectors as the communication quality obtained by the checking in the process of S301 is lower, for example.

Note that the scope of the present invention is not limited to the above-described embodiments.

For example, similarly to the first sector level sweep process in each of the first modification and the second modification, the second sector level sweep process may also be performed with respect to that number of sectors which matches the value of MCS obtained by the checking. For example, the second sector level sweep process may be performed with respect to that number of sectors which is determined in accordance with whether or not the value of MCS obtained is equal to or greater than the predetermined threshold value t1.

Also note that some or all of the functions illustrated in each of FIGS. 5, 8, and 10 may be implemented by the entertainment device 14, for example.

Also note that specific character strings and numerical values mentioned above and specific character strings and numerical values illustrated in the drawings are merely examples, and that those character strings and numerical values are not restrictive.

The invention claimed is:

1. A main beam direction determining device that determines one of a first number of primary candidates as a main beam direction to be used for communication by a communication device, the main beam direction determining device comprising:
 a selection unit configured to select a second number of primary candidates or a third number of primary candidates as a secondary candidate or candidates in accordance with a communication quality of the communication by the communication device, the second number being smaller than the first number, the third number being smaller than the second number,
 wherein each primary candidate is associated with a combination of an angle $\varphi$ and an angle $\theta$, wherein the angle $\varphi$ is an angle formed between an x-axis and a base of a triangle having a hypotenuse defined by the current main beam direction, and the angle $\theta$ is an angle formed between the positive z-axis direction and the current main beam direction; and
 a determination unit configured to determine one of the secondary candidate or candidates as the main beam direction.

2. The main beam direction determining device according to claim 1, wherein the selection unit selects the secondary candidate or candidates on a basis of the main beam direction currently used for the communication by the communication device.

3. The main beam direction determining device according to claim 2, wherein the selection unit selects the secondary candidate or candidates in accordance with smallness of an angle formed between a direction associated with each primary candidate and the main beam direction currently used for the communication by the communication device.

4. The main beam direction determining device according to claim 2, wherein
 the communication device includes a plurality of antennas;
 some of the primary candidates are associated with each of the plurality of antennas; and
 the selection unit selects, as the secondary candidate or candidates, some of the primary candidates associated with the antenna currently used for the communication by the communication device.

5. The main beam direction determining device according to claim 1, further comprising:
 a communication quality data storage unit configured to store communication quality data indicating a communication quality associated with each of the primary candidates,
 wherein the selection unit selects the secondary candidate or candidates on a basis of the past communication qualities associated with the respective primary candidates, the past communication qualities being indicated by the communication quality data stored in the communication quality data storage unit.

6. A main beam direction determining device that determines one of a first number of primary candidates as a main beam direction to be used for communication by a communication device, the main beam direction determining device comprising:
 a selection unit configured to select some of the first number of primary candidates as a secondary candidate or candidates, wherein the secondary candidate or candidates are selected in accordance with smallness of an angle formed between a direction associated with each primary candidate and the main beam direction currently used for the communication by the communication device; and
 a determination unit configured to determine one of the secondary candidate or candidates as the main beam direction.

7. The main beam direction determining device according to claim 6, wherein, when the number of secondary candidates selected is two or more, the determination unit determines one of the two or more secondary candidates as the main beam direction on a basis of a communication quality of a communication performed with each of the two or more secondary candidates, while when the number of secondary candidates selected is one, the determination unit determines the one secondary candidate as the main beam direction.

8. The main beam direction determining device according to claim 7, further comprising: a beam refinement process performing unit configured to perform a beam refinement process of adjusting the determined main beam direction.

9. A main beam direction determining method of determining one of a first number of primary candidates as a main beam direction to be used for communication by a communication device, the method comprising:
 selecting a second number of primary candidates or a third number of primary candidates as a secondary candidate or candidates in accordance with a communication quality of the communication by the communication device, the second number being smaller than the first number, the third number being smaller than the second number,
 wherein each primary candidate is associated with a combination of an angle $\varphi$ and an angle $\theta$, wherein the angle $\varphi$ is an angle formed between an x-axis and a base of a triangle having a hypotenuse defined by the current main beam direction, and the angle $\theta$ is an angle formed between the positive z-axis direction and the current main beam direction; and
 determining one of the secondary candidate or candidates as the main beam direction.

10. A non-transitory, computer readable storage medium containing a computer program, which when executed by a computer, causes the computer to determine one of a first number of primary candidates as a main beam direction to be used for communication by a communication device, by carry out actions, comprising:
- selecting a second number of primary candidates or a third number of primary candidates as a secondary candidate or candidates in accordance with a communication quality of the communication by the communication device, the second number being smaller than the first number, the third number being smaller than the second number,
- wherein each primary candidate is associated with a combination of an angle φ and an angle θ, wherein the angle φ is an angle formed between an x-axis and a base of a triangle having a hypotenuse defined by the current main beam direction, and the angle θ is an angle formed between the positive z-axis direction and the current main beam direction; and
- determining one of the secondary candidate or candidates as the main beam direction.

11. The main beam direction determining device according to claim 1, wherein, when the number of secondary candidates selected is two or more, the determination unit determines one of the two or more secondary candidates as the main beam direction on a basis of a communication quality of a communication performed with each of the two or more secondary candidates, while when the number of secondary candidates selected is one, the determination unit determines the one secondary candidate as the main beam direction.

12. The main beam direction determining device according to claim 1, further comprising: a beam refinement process performing unit configured to perform a beam refinement process of adjusting the determined main beam direction.

* * * * *